United States Patent
Kau et al.

(10) Patent No.: US 9,053,111 B2
(45) Date of Patent: *Jun. 9, 2015

(54) INTERACTION-BASED MANAGEMENT OF CONTACT ENTRIES

(71) Applicant: International Business Machines Corporation, Armonk, NY (US)

(72) Inventors: Christian Benjamin Kau, Los Altos, CA (US); Jeffrey S. Pierce, Sunnyvale, CA (US); Christine M. Robson, San Jose, CA (US); Jerald T. Schoudt, Douglassville, PA (US)

(73) Assignee: International Business Machines Corporation, Armonk, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/731,230

(22) Filed: Dec. 31, 2012

(65) Prior Publication Data

US 2014/0188810 A1 Jul. 3, 2014

Related U.S. Application Data

(63) Continuation of application No. 13/730,203, filed on Dec. 28, 2012.

(51) Int. Cl.
*G06F 17/30* (2006.01)

(52) U.S. Cl.
CPC .... *G06F 17/30073* (2013.01); *G06F 17/30306* (2013.01)

(58) Field of Classification Search
None
See application file for complete search history.

(56) References Cited

U.S. PATENT DOCUMENTS

| 6,721,784 | B1 | 4/2004 | Leonard et al. |
| 7,788,296 | B2 | 8/2010 | D'Albora et al. |
| 8,041,745 | B2 | 10/2011 | Newton et al. |
| 2002/0169748 | A1 | 11/2002 | Macholda |
| 2005/0044152 | A1 | 2/2005 | Hardy et al. |
| 2010/0030788 | A1 | 2/2010 | Chen et al. |
| 2010/0144331 | A1* | 6/2010 | Koberg et al. ............... 455/418 |

FOREIGN PATENT DOCUMENTS

| WO | 2011023575 | 3/2011 |
| WO | 2011050714 | 5/2011 |

OTHER PUBLICATIONS

Non-Final Office Action dated Oct. 9, 2014 received for U.S. Appl. No. 13/730,203.

(Continued)

*Primary Examiner* — Jay Morrison
(74) *Attorney, Agent, or Firm* — Fleit Gibbons Gutman Bongini & Blanco PL; Thomas Grzesik

(57) ABSTRACT

Embodiments of the invention relate to interaction-based management of contact entries. In one embodiment, at least one contact in a set of contacts is determined to be associated with an archiving indicator. The archiving indicator indicates that one or more archiving operations are to be performed on the at least one contact. The set of contacts is associated with a user. At least one archiving threshold associated with the at least one contact is identified based on the determination. A determination is made as to whether the at least one archiving threshold has been satisfied. The at least one contact is archived based on the at least one archiving threshold having been satisfied.

18 Claims, 9 Drawing Sheets

(56) References Cited

OTHER PUBLICATIONS

Black, R. et al; "Address Book Style of List", technical disclosure, Feb. 1, 1990.

IBM; "Address Book Automatic Update", technical disclosure, May 1, 2006.

IBM; "Apparatus and System to Enable Automatic Address Book Management in Legacy Telecom System", technical disclosure, Aug. 28, 2008.

* cited by examiner

| Contact Name | Telephone Number(s) | Email Address(es) | Physical Address(es) | Entry Status | ... |
|---|---|---|---|---|---|
| Contact_A | Tel_No_1 | Email_1 | Phys_Addr_1 | Permanent | ... |

404 → Contact Name
406 → Telephone Number(s)
408 → Email Address(es)
410 → Physical Address(es)
412 → Entry Status
402

FIG. 4

| Contact Name | Telephone Number(s) | Email Address(es) | Physical Address(es) | Temporal Event | Entry Status | ... |
|---|---|---|---|---|---|---|
| Contact_B | Tel_No_2 | Email_2 | Phys_Addr_2 | Meeting_A, Date_A, Time_A | Transient | ... |

FIG. 5

| Contact Name | Telephone Number(s) | Email Address(es) | Physical Address(es) | Temporal Event | Entry Status | Archiving Date / Time | |
|---|---|---|---|---|---|---|---|
| Contact_A | Tel_No_1 | Email_1 | Phys_Addr_1 | N/A | Permanent | N/A | ... |
| Contact_B | Tel_No_2 | Email_2 | Phys_Addr_2 | Date_A Time_A Meeting_A | Transient | Date_A Time_B | ... |
| Contact_C | Tel_No_3 | Email_3 | Phys_Addr_3 | ... | Transient | 30 days | ... |
| ... | ... | ... | ... | ... | ... | ... | ... |
| Contact_N | Tel_No_N | Email_N | Phys_Addr_N | ... | Permanent | N/A | ... |

FIG. 6

| Contact ID | Interaction | Date | Time | ... |
|---|---|---|---|---|
| Contact_A | Sent Text message | Date_1 | Time_1 | ... |
| | Received Text message | Date_1 | Time_2 | ... |
| | Received Text message | Date_1 | Time_3 | ... |
| | Called | Date_1 | Time_4 | ... |
| | Received Email | Date_2 | Time_5 | ... |
| | Sent Social Network Message | Date_3 | Time_6 | ... |
| | Received Social Network Message | Date_3 | Time_7 | ... |
| | Received VOIP Call | Date_4 | Time_8 | ... |
| | ... | ... | ... | ... |
| | Played Game | Date_N | Time_N | ... |

FIG. 7

| Contact Name | Telephone Number(s) | Email Address(es) | Physical Address(es) | Archive Status ← 802 | 105 |
|---|---|---|---|---|---|
| Contact_A | Tel_No_1 | Email_1 | Phys_Addr_1 | N/A | ⋮ |
| Contact_B | Tel_No_2 | Email_2 | Phys_Addr_2 | Archived | ⋮ |
| Contact_C | Tel_No_3 | Email_3 | Phys_Addr_3 | N/A | ⋮ |
| ⋮ | ⋮ | ⋮ | ⋮ | ⋮ | ⋮ |
| Contact_N | Tel_No_N | Email_N | Phys_Addr_N | N/A | ⋮ |

FIG. 8

INTERACTION-BASED MANAGEMENT OF CONTACT ENTRIES

CROSS REFERENCE TO RELATED APPLICATION

This application is a continuation of and claims priority from U.S. patent application Ser. No. 13/730,203 filed on Dec. 28, 2012, the entire disclosure of which is herein incorporated by reference in its entirety.

BACKGROUND

Embodiments of the present invention generally relate to contact management, and more particularly relates to interaction-based management of contact entries.

Electronic address books and contact lists allow users to digitally maintain details associated with various individuals. However, effectively managing contact entries is becoming a difficult task, especially in view of the numerous sources from which contacts can originate. Conventional address book applications are generally inadequate for effectively managing large numbers of contacts, and the lightweight and transient interactions that people engage in.

BRIEF SUMMARY

In one embodiment a system for managing contacts is disclosed. The system comprises memory and a processor that is communicatively coupled to the memory. A contact manager is communicatively coupled to the memory and the processor. The contact manager is configured to perform a method. The method comprises determining that at least one contact in a set of contacts is associated with an archiving indicator. The archiving indicator indicates that one or more archiving operations are to be performed on the at least one contact. The set of contacts is associated with a user. At least one archiving threshold associated with the at least one contact is identified based on the determination. A determination is made as to whether the at least one archiving threshold has been satisfied. The at least one contact is archived based on the at least one archiving threshold having been satisfied.

In another embodiment, a computer program product for managing contacts is disclosed. The computer program product comprises a computer readable storage medium having program code embodied therewith. The program code is readable/executable by a processor to determine that at least one contact in a set of contacts is associated with an archiving indicator. The archiving indicator indicates that one or more archiving operations are to be performed on the at least one contact. The set of contacts is associated with a user. At least one archiving threshold associated with the at least one contact is identified based on the determination. A determination is made as to whether the at least one archiving threshold has been satisfied. The at least one contact is archived based on the at least one archiving threshold having been satisfied.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIGS. 4-5 illustrate various examples of contact entries according to various embodiments of the present invention;

FIG. 6 illustrates one example of contact information comprising a plurality of contact entries according to one embodiment of the present invention;

FIG. 7 illustrates one example of an interaction profile according to one embodiment of the present invention;

FIG. 8 illustrates one example of an updated contact entry after the contact entry has been archived according to one embodiment of the present invention;

DETAILED DESCRIPTION

Operating Environment

Figure 1:
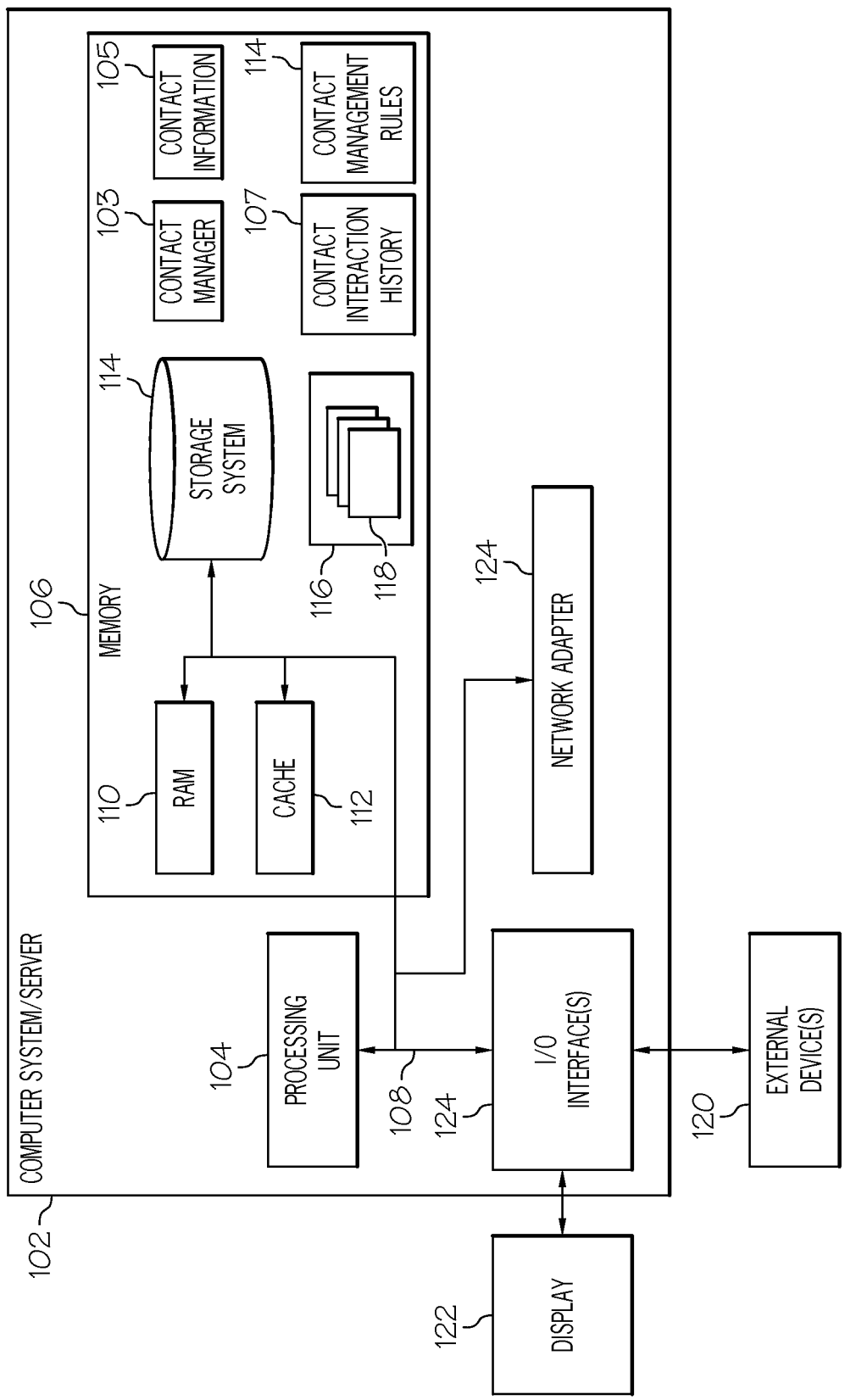
FIG. 1 is a block diagram illustrating one example of an operating environment according to one embodiment of the present invention.

FIG. 1 shows one example of an operating environment 100 applicable to various embodiments of the present invention. In particular, FIG. 1 illustrates an information processing system 102 that can be utilized in embodiments of the present invention. The information processing system 102 shown in FIG. 1 is only one example of a suitable system and is not intended to limit the scope of use or functionality of embodiments of the present invention described above. Any suitably configured processing system such as desktop computers, laptop computers, servers, wireless devices (e.g., mobile phones, tablets, personal digital assistants, etc.), and the like can be used as the information processing system 102 in embodiments of the present invention.

As illustrated in FIG. 1, the information processing system 102 is in the form of a general-purpose computing device. The components of the information processing system 102 can include, but are not limited to, one or more processors or processing units 104, a system memory 106, and a bus 108 that couples various system components including the system memory 106 to the processor 104.

The bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 106, in one embodiment, comprises a contact manager 103, contact information 105, contact interaction history information 107, and contact management rules 114. Each of these components is discussed in greater detail below. It should be noted that even though FIG. 1 shows the contact manager 103 residing in the main memory, the contact manager 103 can reside within the processor 104 to be a separate hardware component. Also, the contact information 105 is not required to reside within the information processing system 102. For example, at least a portion of the contact information 105 can reside within one or more other information processing systems and be provided to the information processing system 102 over one or more networks.

The system memory 106 can include computer system readable media in the form of volatile memory, such as random access memory (RAM) 110 and/or cache memory 112. The information processing system 102 can further include other removable/non-removable, volatile/non-volatile computer system storage media. By way of example only, a storage system 114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. The memory 106 can include at least one program product having a set of program modules that are configured to carry out the functions of an embodiment of the present invention.

Program/utility 116, having a set of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the present invention.

The information processing system 102 can also communicate with one or more external devices 120 such as a keyboard, a pointing device, a display 122, etc.; one or more devices that enable a user to interact with the information processing system 102; and/or any devices (e.g., network card, modem, etc.) that enable computer system/server 102 to communicate with one or more other computing devices. Such communication can occur via I/O interfaces 124. Still yet, the information processing system 102 can communicate with one or more networks such as a local area network (LAN), a general wide area network (WAN), and/or a public network (e.g., the Internet) via network adapter 126. As depicted, the network adapter 126 communicates with the other components of information processing system 102 via the bus 108. Other hardware and/or software components can also be used in conjunction with the information processing system 102. Examples include, but are not limited to: microcode, device drivers, redundant processing units, external disk drive arrays, RAID systems, tape drives, and data archival storage systems.

Figure 2:
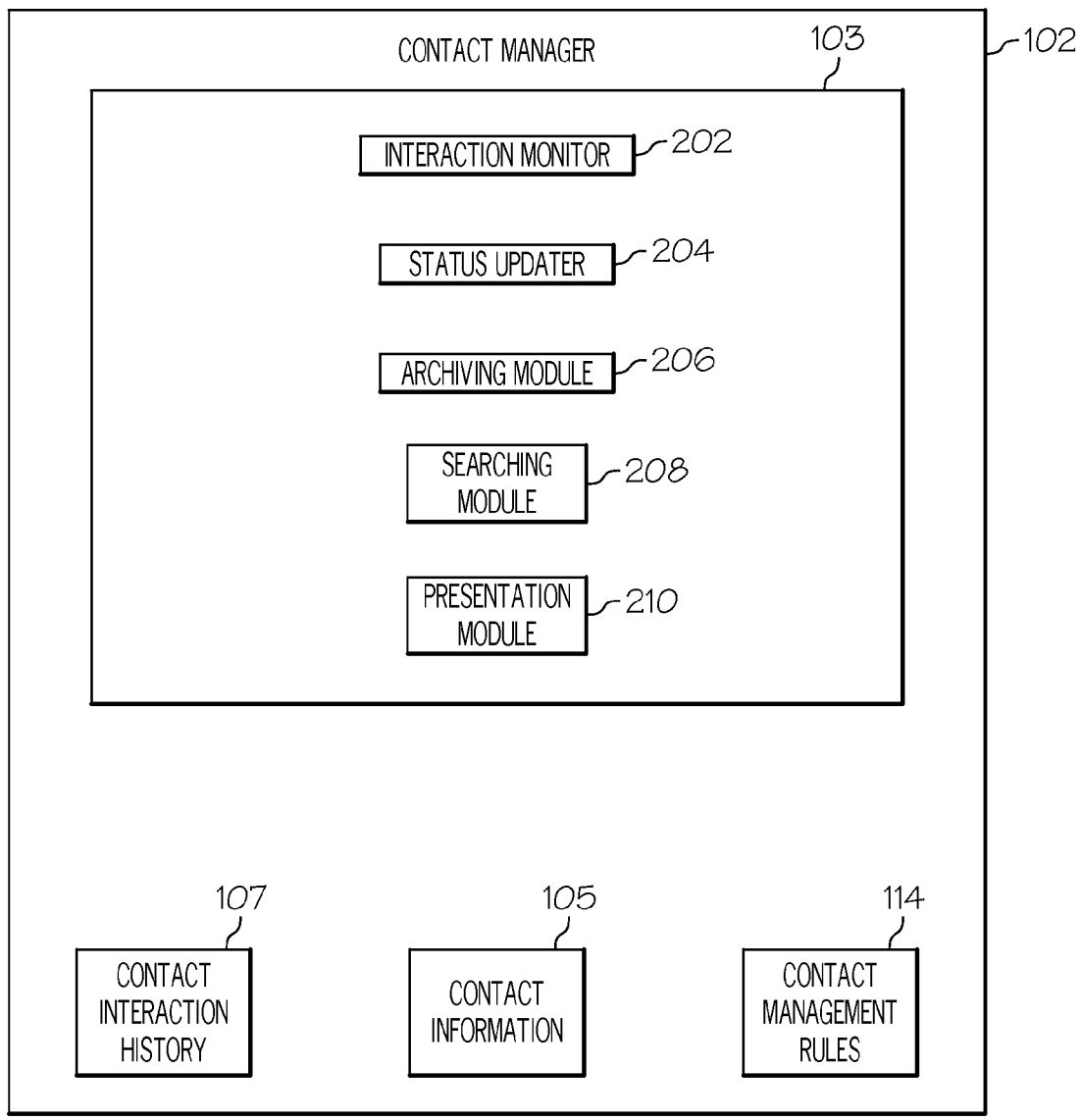
FIG. 2 is a block diagram illustrating a detailed view of a contact manager of the operating environment of FIG. 1 according to one embodiment of the present invention.

FIG. 2 shows a more detailed view of the contact manager 103. In this embodiment, the contact manager 103 comprises an interaction monitor 202, a status updater 204, an archiving module 206, a searching module 208, and a presentation module 210. As will be discussed in greater detail below, the contact manager 103 utilizes each of these components to manage contact entries within the contact information 105. For example, the contact manager 103 designates contact entries either as permanent contact entries or transient contact entries. In one embodiment, permanent contact entries are entries that remain within the contact information 105 until a user manually deletes these entries. Transient entries are entries associated with an expiration date. Once the expiration date occurs a transient entry is automatically archived or deleted by the contact manager 103.

Distinguishing between permanent and transient contacts allows the lightweight capture of contact information (e.g., name, address, phone numbers, email addresses, etc.) for weak ties that are likely to be of limited importance to a user, or that have a temporal length of interaction with a user. Also, marking contact entries as transient allows these entries be automatically removed from the contact information 105 (or archived), thereby providing a more organized and efficient set of contact information 105. It should be noted that throughout this discussion the terms "contact entries" and "contacts" are used interchangeably.

Contact Management

In one embodiment, the contact manager 103 manages contact entries based on a user's interactions therewith. For example, the contact manager 103 assigns/associates a contact status or type to each of the contact entries of the contact information 105 based on a user's interactions (or lack thereof) with the contact entries. A first contact status/type, referred to herein as a "permanent contact" or a "non-archiving indicator", is associated with contacts that are to remain within the contact information 105 until a user manually deletes these contacts. A second contact status/type, referred to herein as a "transient contact" or an "archiving indicator", is associated with contacts that are to be automatically archived or deleted from the contact information 105 after a given threshold has been satisfied (or has failed to be satisfied).

Figure 3:
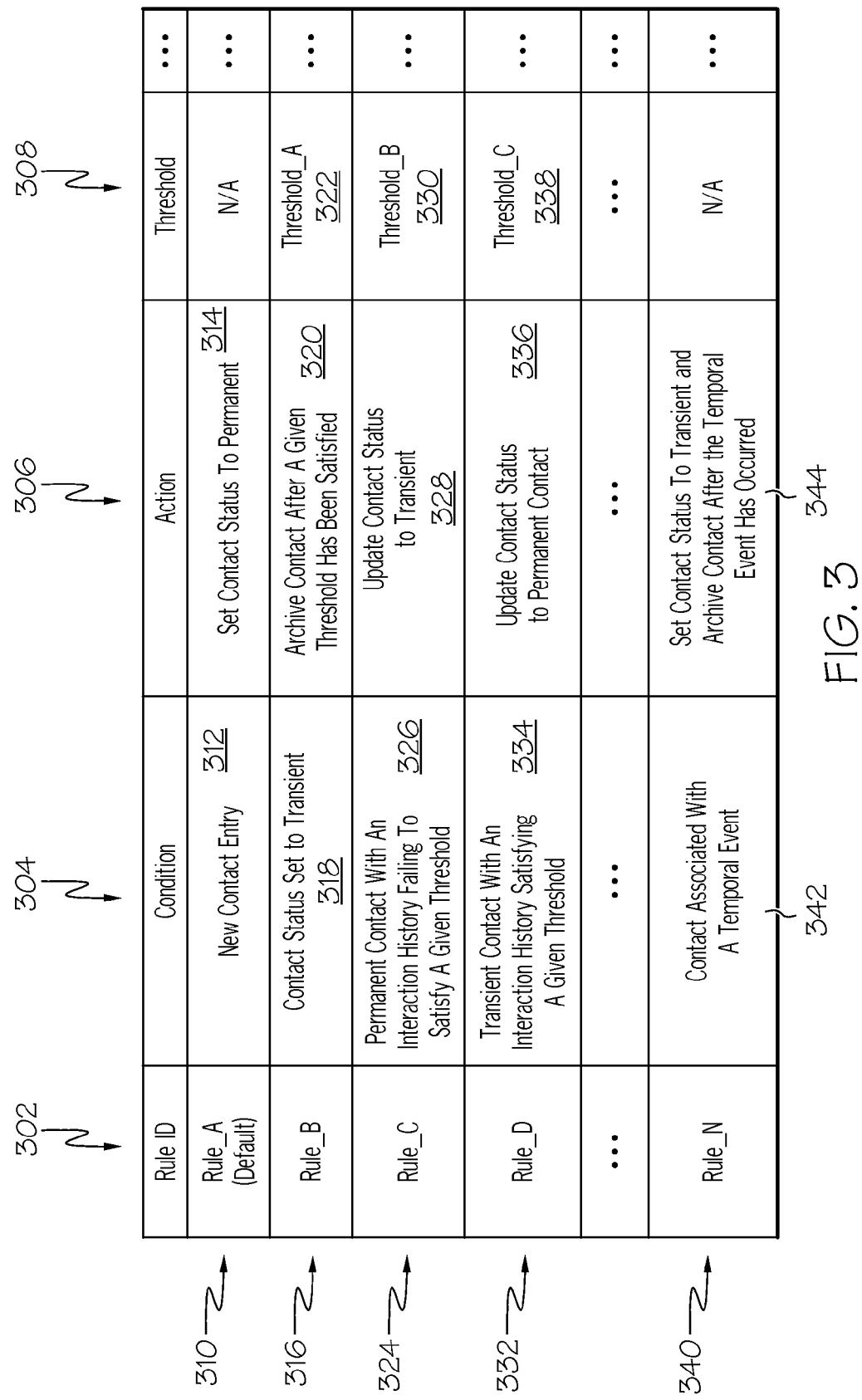
FIG. 3 illustrates one example of contact management rules according to one embodiment of the present invention.

A contact can be designated as a permanent contact or a transient contact either manually by a user of the information processing system 102 or automatically by the contact manager 105. The contact manager 105 assigns a permanent or transient contact status to a given contact based on one or more contact management rules 114. These rules 114, in one embodiment, are predefined rules and/or are created by the user. FIG. 3 shows one example of the contact management rules 114 with a unique identifier 302 being associated with each rule. In the example shown in FIG. 3, each row corresponds to a given rule. In this example, each rule is associated with one or more conditions 304 to be satisfied for the rule to be applied, one or more actions 306 to be performed based on the associated conditions being satisfied, and one or more optional thresholds 308. It should be noted that the rules shown in FIG. 3 are only examples of rules applicable to various embodiments of the present invention. For example, any rule based on time, interaction history, and/or the like is applicable to various embodiments of the present invention.

FIG. 3 shows a first rule, Rule_A 310, which is set as the default rule either by the user or the contact manager 103. Rule_A 302 is associated with a Condition 312 that is satisfied when a new contact entry is created by a user, an application on the information processing system 102, etc. Rule_A 310 is also associated with an Action 314 that instructs the contact manager 103 to set the contact status of the new contact entry to a "Permanent" contact status. Alternatively, Rule_A 310 can instruct the contact manager 103 to assign a "Transient" contact status to a new contact entry. It should be noted that, in one embodiment, a user's manual entry of a contact status for a given contact overrides the action performed by the contact manager 103, or indicates to the contact manager 103 that a contact status does not need to be automatically assigned to the contact. For example, based on Rule_A 310, the contact manager 103 automatically assigns a permanent contact status to a newly created contact if the user has not associated a contact status with the contact during the creation of the contact entry. If the user provides a contact status for the contact during creation of the contact entry the contact manager 103 does not automatically apply the Action 306 associated with Rule_A 310. It should be noted that instead of automatically applying the contact status to a newly created contact, the contact manager 103, in one embodiment, prompts the user to select either a permanent or transient contact status for the newly created contact.

FIG. 3 shows a second rule, Rule_B 316, associated with a Condition 318 that is satisfied when the contact status of a contact is set to "Transient". The Action 320 associated with Rule_B 316 instructs the contact manager 103 to archive the contact after a given threshold has been satisfied (or has failed to be satisfied), such as Threshold_A 322. For example, Threshold_A 322 can be a time threshold, interaction threshold, a combination thereof, and/or the like. A time threshold can include (but is not limited to) a specific date and/or a given number of seconds, minutes, hours, days, weeks, months, years, etc. An interaction threshold can include (but is not limited to) a given number of interactions with the contact. Interactions include, for example, calls to/from the contact, text messages to/from the contact, multimedia messages to/from the contact, social networking messages to/from the contact, email messages to/from the contact, etc. The contact manager 103 tracks/monitors these interactions with a given contact as discussed in greater detail below.

One example a threshold 322 is as follows: "Number of interactions with Contact is less than 5 within 30 days. Based on this threshold 322 and Rule_B 316 the contact manager 103 archives a given contact with a contact status of "Transient" if the number of interactions with this contact is less than 5 within a 30 day period. It should be noted that a threshold can have various levels of granularity. For example, in the example above Threshold_A 322 is associated with any contact and any type of interaction. However, different thresholds can apply to different contacts for a given rule. For example, Rule_B 316 can have one threshold (e.g., Number of interactions with Contact_A is less than 5 within 30 days) that is associated with a first contact and another threshold (e.g., Number of interactions with Contact_B is less than 15 within 30 days) that is associated with a second contact. Also, the threshold 322 can identify one or more specific interactions of interest. For example, the threshold 322 can indicate that the combined number of phone calls and text messages associated with Contact_A needs to be less than 5 to perform an archiving operation.

The contact manager 103 can archive a contact in various ways. In one embodiment, the contact manager 103 archives a contact by hiding the contact from view when the contact information 105 is displayed to the user. In this embodiment, the archived contact remains stored within the contact information 105, but is not displayed to the user (unless requested by the user). In another embodiment, the contact manager 103 deletes the archived contact from the contact information 105. The archived contact can be deleted automatically by the contact manager 103, or the contact manager 103 can prompt the user to determine whether the contact should be deleted. In yet another embodiment, a contact can be deleted from the contact information 105 and stored within a separate set of contact information for archived contacts. This allows for the archived contact to be retrieved when needed. The contact manager 103 can reactivate (de-archive) an archived contact upon receiving a request from the user or detecting an interaction between the user and the archived contact.

FIG. 3 shows a third rule, Rule_C 324, associated with a Condition 326 that is satisfied when a contact associated with a contact status of "Permanent" has an interaction history that fails to satisfy (or has satisfied) one or more given thresholds such as Threshold_B 330. Similar to Threshold_A 322 discussed above, Threshold_B 330 can be threshold specific to a given contact or a general threshold that is applicable to a plurality of contacts. For example, if Threshold_B 330 is defined as "Number of interactions <30 within 30 days" the Action 328 associated with Rule_C 326 instructs the contact manager 103 to change the contact status of a given contact from "Permanent" to "Transient" if the user has interacted with the given contact less than 30 times in 30 days.

Also, Rule_C 324 or another rule can be associated with an action that sets an archiving date or time interval for a contact entry associated with a "Transient" status. For example, when a contact entry is associated with a "Transient" status a rule can instruct the contact manager 103 to assign an archiving date or time interval (e.g., 30 days) to the contact entry. Upon the expiration of this time interval or upon reaching the set date, the contact manager 103 archives or deletes the contact entry. The contact manager 103 can automatically assign a default archiving date or time interval and/or prompt the user to enter this information. In one embodiment, different archiving dates or time intervals can be assigned to different contact entries based on various factors. For example, different archiving dates or time intervals can be assigned based on contact type (e.g., business contact, personal contact, etc.), temporal event type, etc. Also, one or more additional rules can also define how this archiving date or time interval is to be extended for a "Transient" contact entry. For example, one or more rules can indicate that if a given number of interactions are performed by a user with a "Transient" contact the archiving date or time interval is to be extended a given amount of time. These rules can also be configured such that different interactions result in different archival date/time extensions. For example, voice calls can result in extending the archiving date or time interval by 5 days, while a text message can result in extending the archiving date or time interval by 2 days.

A fourth rule, Rule_D 332, is associated with a Condition 334 that is satisfied when a Transient contact has an interaction history satisfying a given threshold, Threshold_C 338. For example, if Threshold_C 338 is defined as "Number of interactions≥30 within 30 days" the Action 336 associated with Rule_D 332 instructs the contact manager 103 to change the contact status of a given contact from "Transient" to "Permanent" if the user has interacted with the given contact 30 or more times in 30 days.

A fifth rule, Rule_N 340, is associated with a Condition 342 that is satisfied when a contact is associated with a temporal event. A temporal event, for example, is an event that only occurs for a specific amount of time such as (but not limited to) a meeting/conference, a wedding, etc. For example, contacts such as wedding planners, florists, etc. can be associated with a wedding. The user may only need to be in contact with these individuals for the duration of the wedding planning and the wedding day. Therefore, Rule_N 340 is associated with an Action 344 that instructs the contact manager 103 to archive a contact(s) associated with a temporal event upon the conclusion of the event.

In one embodiment, the contact manager 103 detects when a new contact entry is added to the contact information 105 either by the user, an application, etc. the contact manager 103. FIG. 4 shows one example of a new contact entry 402 created by a user. This contact entry 402 comprises Contact Name information 404, Telephone Number information 406, Email Address information 408, Physical Address information 410, and optional Contact Status information 412. It should be noted that other information can be included within the contact entry 402 as well. The contact manager 103 analyzes the new contact entry to determine if the user has associated a contact status with the new contact entry. For example in this example, FIG. 4 shows that the user has assigned a "Permanent" contact status to this contact. Therefore, the contact manger 103 does not need to assign a contact status since this status was already provided by the user.

If the user does not provide a contact status for the new entry, the contact manager 103 analyzes the contact management rules 114 to determine if any rules are applicable to this situation. For example, the contact manager 103 determines that Rule_A 310 in FIG. 3 applies since this is a new contact entry without any contact status set by the user. Therefore, the contact manager 103 sets the contact status for this new contact entry to "Permanent". The contact manager creates an interaction profile similar to that shown in FIG. 7. It should be noted that when a new contact entry is created it does not need to be initially associated with a contact status. For example, the contact manager 103 can wait a given period of time to assign a contact status to the entry. During this period of time the contact manager 103 monitors the interactions between the user and the contact to determine if the contact should be assigned a "Permanent" or a "Transient" status.

In another embodiment, even though a user may not provide a contact status for the new contact entry, the user may provide information that the contact manager 103 can use to determine which contact status should be assigned to the contact. For example, FIG. 5 shows another example of a contact entry 502 in which the user has indicated that this contact is associated with a meeting within a "Temporal Event" column 504 of the entry 502. When the contact manager 103 analyzes this contact entry the manager 103 determines that the contact is associated with a meeting, which is a temporal event. Therefore, the contact manager 103 sets the contact status of this contact to "Transient" based on Rule_N 340 in FIG. 3.

The contact manager 103, in one embodiment, determines if an event is a temporal event based on the location of the information entered into the contact entry 502. For example, in FIG. 5, the user entered information under a "Temporal Event" section 504 of the entry 502. In another embodiment, the contact manager 103 determines if an event is a temporal event based on the name or type associated with the event (e.g., wedding, meeting, etc.). In yet another embodiment, scheduling and/or calendar information is associated with the event. For example, a specific date/time, a range of date/ times, etc. can be associated with the event. This scheduling and/or calendar information can be provided by the user in the contact entry 402, 502 or obtained from scheduling/calendar information. For example, the contact manager 103 is able to interface with various scheduling/calendar applications or information associated with the user.

The scheduling/calendar applications or information can reside within the information processing system 102 or on other systems (email servers, social networking servers, etc.) accessible by the information processing system 102. The contact manager 103, in one embodiment, searches the scheduling/calendar applications or information of the user for events associated with the new contact. When the contact manager 103 identifies scheduling/calendar information associated with the new contact the contact manager 103 records at least the starting and/or end times/dates of the event so that the manager 103 can automatically archive/delete the contact when the event ends.

FIG. 6 shows one example of the contact information 105 after a plurality of contact entries has been stored therein. In the example of FIG. 6, each row 602 corresponds to a contact entry. Each contract entry is associated with Contact Name information 604, Telephone Number information 606, Email Address information 608, Physical Address information 610, optional Temporal Event information 612, Contact Status information 614, and Archiving information 616. The Archiving information 616 identifies the archiving date or time interval (if any) for a "Transient" contact, as discussed above with respect to FIG. 3. It should be noted that one or more of the information sets under the columns shown in FIG. 6 can be stored separate from the contact information 105. For example, the Contact Status information 614 and the Archiving information 616 can be stored separate from the contact information 105.

For each of the contact entries in the contact information the contact manager 103 creates one or more interaction profiles, which are stored in the contact interaction history information 107. It should be noted that the user can also select specific contact entries for which contact management is to be performed on. In this embodiment, only the selected contact entries are assigned a contact status and have their interactions monitored. FIG. 7 shows one example of an interaction profile 702 associated with Contact_A of FIG. 6. In the example of FIG. 7, the interaction profile 702 comprises a Contact_ID 704 associated with the contact that uniquely identifies the contact (or contact entry). The interaction profile 702 also comprises Interaction information 706 identifying each interaction performed by the user with the given contact. For example, FIG. 7 shows that a plurality of interactions 708 have been recorded for Contact_A. The interaction profile 702 further comprises date information 710 and time information 712 that identifies the date and time, respectively, when the interaction with the contact was performed. It should be noted that other information can be included within the interaction profile 702 as well.

In one embodiment, the interaction monitor 202 of the contact manager 103 monitors each interaction (or a user specified set of interaction types) between the user and the contact. The interaction monitor 202 detects each interaction between the user and the contact. Interactions include (but are not limited to) sending/receiving text messages, sending/receiving phone calls, sending/receiving video calls, sending/ receiving Voice over IP calls, sending/receiving social network messages, sending/receiving emails, playing a game with the contact, etc. The interaction monitor 202, in one embodiment, identifies the contact associated with the interaction based on the "to/from" information of a message or call, or from any other data associated with the interaction that identifies the parties of the interaction.

The interaction manager 202 then records the interaction event or type within the interaction profile 702 associated with the contact. The interaction manager 202 also records the data and time associated with the interaction even as well. For example, FIG. 7 shows that the user sent a text message to Contact_A on Date_1 at Time_1; received a text message from Contact_A on Date_1 at Time_2; received a text message from Contact_A at Time_3; and called Contact_A on Date_1 at Time_4. It should be noted that the interaction monitor 202 can also record additional information associated with an interaction than what is shown in FIG. 7. Also, the interaction monitor 202 is not required record information identifying the event or event type. For example, the interaction monitor 202 can keep a generic or event type interaction count that is increased each time the user interacts with the given contact.

In one embodiment, the contact manager 103 utilizes the interaction profiles 702 to determine whether a given contact status is to be associated with a contact and/or whether a contact is to be archived based on the contact management rules 114. For example, the status updater 204 of the contact manager 103 monitors the interaction profiles 702 associated with one or more of the contacts to determine if the contact status should be updated/changed. The status updater 204 compares the information in the interaction profile 702 to one or more of the contact management rules 114 associated with updating contact status. If any of these rules apply, the status updater 202 performs the action associated with the rule.

For example, in one embodiment, a "Transient" contact status associated with a contact can be updated/changed to a "Permanent" contact status based on the user's interaction with the contact. A contact management rule 114 can indicate that a "Transient" contact status is to be changed to a "Permanent" contact status if the number of interactions satisfies (or fails to satisfy) a given threshold, as discussed above. For example, Rule_D 332 shown in FIG. 3 indicates that for a contact status to be changed from "Transient" to "Permanent" the number of interactions has to satisfy a given threshold. The threshold can be a given number of interactions (e.g., 5 interactions); a given number of interactions of a given type; a given number of interactions within a given period of time (e.g., 5 interactions within 30 days); a given number of interactions of a given type within a given period of time; etc.

For example, consider an interaction profile associated with Contact_C of FIG. 6, who is currently associated with a "Transient" contact status. In this example, an interaction profile for Contact_C currently indicates that the user has interacted with Contact_C seven (7) times in the last 15 days. Also, an applicable contact management rule 114 has the following threshold: "Number of Interactions >5 in 30 days". Therefore, since the user has interacted with Contact_C 7 times in the last 15 days, the status updater 202 changes the contact status of Contact_C to "Permanent" based this rule 114 and the interaction profile for Contact_C.

In another embodiment, a "Transient" contact status is not changed to a "Permanent" contact status, but the archival/expiration date or interval associated with the contact is extended based on the interaction profile associated therewith. For example, the archiving module 206 can extend the archival/expiration date associated with a "Transient" contact based on the frequency of interaction, type of interaction, date/time of interaction, a combination thereof, and/or the like. It should also be noted that different extension rules can apply to different contacts. For example, a given frequency of interactions associated with a first "Transient" contact may extend the archival/expiration date associated with the first "Transient" contact differently than the same frequency of interactions associated with a second "Transient" contact.

In yet another embodiment, a "Permanent" contact status can be changed to a "Transient" contact status based on the interaction profile and one or more contact management rules 114. For example, consider Contact_N of FIG. 6, who is associated with a "Permanent" contact status. In this example, an interaction profile associated with Contact_N indicates that the user has interacted with Contact_N three (3) times in the last 30 days. Also, an applicable contact management rule 114 indicates that "Permanent" contact status is to be updated to a "Transient" contact status if the user interacts with a contact less than 5 times in 30 days. Therefore, the status updater 202 the contact status of Contact_N to "Transient" based on the interaction profile for Contact_N and the applicable contact management rule(s) 114.

In addition to changing the contact status, the contact management rules 114 and the interaction history information 107 are also used to determine when to archive "Transient" contacts. For example, the archiving module 206 of the contact manager 103 analyzes the interaction profiles in the interaction history information 107, and identifies when a "Transient" contact is to be archived based on the contact management rules 114. For example, based on Rule_B 316 in the example of FIG. 3 a "Transient" contact is to be archived after Threshold_A has been satisfied. As discussed above, this threshold can be a time threshold, an interaction threshold, a combination thereof, and/or the like. For example, Threshold_A can indicate that a "Transient" is to be archived if the contact is "Transient" for at least 30 days.

In this example, the archiving module 206 determines how long a contact has been associated with a "Transient" status based on the contact information associated with the contact. For example, the contact manager 103 stores a date/time stamp associated with a given contact whenever a contact status is assigned to a contact or is changed. The archiving module 206 identifies the date/time associated with the stamp and determines the number of days (or amount of time) that the contact has been associated with the "Transient" status. If the number of days (or amount of time) satisfies the threshold the archiving module 206 archives the contact.

As discussed above, archiving can include removing the contact from the contact information and storing the contact in a set of archived contact information. Therefore, the presentation module 210 of the contact manager 103 does not present an archived contact to the user when the user interacts with the contact information 105. However, the presentation module 210 can present the archived contacts in the archived information to a user upon receiving a request from the user. In another embodiment, an archived contact is kept within the contact information 105 but is marked/flagged as archived, as shown in FIG. 8. For example, FIG. 8 shows that Contact_B has been marked as "Archived" under an Archive Status column 802. In this embodiment, even though the archived contact still remains within the contact information 105, the presentation module 210 identifies the "Archived" flag and hides/prevents this contact from being displayed to the user.

In one embodiment, when the archiving module 206 determines that a contact is to be archived, the contact manager 103 prompts the user to select whether the contact should be archived or have its expiration/archival date (e.g., threshold) extended. If the user selects to extend the expiration/archival date extended the user can enter/select the number of days (e.g., 30 days, 90 days, 365 days) or amount of time to extend the expiration/archival. Alternatively, the contact manager 103 can extend the expiration/archival date by a default amount. In another embodiment, a contact determined to be archived can be deleted from the information processing system 102. In this embodiment the contact manager 103 automatically deletes the contact when the archiving module 206 determines that the contact is to be archived, or prompts the user. For example, the contact manager 103 prompts the user if the contact should be deleted or archived as discussed above.

In an embodiment where a contact is assigned with a "Transient" status based an association with a temporal event, the archiving manager 206 performs the archiving/deleting operations discussed above upon determining that the temporal even has completed. For example, Contact_B of FIG. 6 is associated with a temporal event Meeting_A that is scheduled for Date_A from Time_A to Time_B. Therefore, based on Rule_N of FIG. 3, the archiving module 206 monitors for Date_A and Time_B. Once Date_A and Time_B occur, the archiving module 206 archives/deletes the contact as discussed above.

Figure 9:
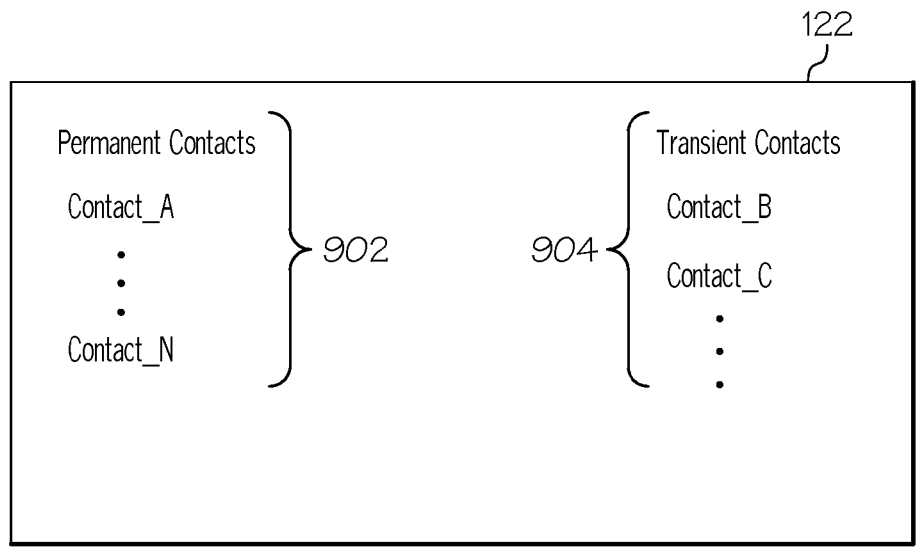
FIG. 9 illustrates one example of displaying contacts to a user according to one embodiment of the present invention.

In one embodiment, the contact manager 103 groups/sorts the contacts based on their associated contact status. For example, the contact manager 103 identifies each "Permanent" contact status and groups these contacts together, and also identifies each "Transient" contact and groups these contacts together. The presentation module 210 can then present these grouped contacts to the user via an application, web browser, Application Programming Interface (API), etc. of the information processing system 102, as shown in FIG. 9. For example, FIG. 9 shows that a set of "Permanent" contacts 902 have been grouped together and a set of "Transient" contacts 904 have been grouped together and displayed to the user via the display 122 of the information processing system 102.

It should be noted that the contact manager 103, in one embodiment, can group/sort "Transient" contacts into clusters (e.g. by tag, by manual grouping, by temporal events, other factors, etc.). When associated with a cluster, entries by default share the expiration/archival date of the containing cluster. For example, consider two clusters of "Transient" contacts, Cluster_A and Cluster_B. Cluster_A is associated with an expiration/archival date of Date_A and Cluster_B is associated with an expiration/archival date of Date_B. Each "Transient" contact in Cluster_A is associated with the expiration/archival date of Date_A, while each of the "Transient" contact in Cluster_B is associated with the expiration/archival date of Date_B. The user can override the expiration date associated with the cluster on a per entry basis. For example, based on a cluster the user is able to identify all contacts with a given an expiration/archival date. The user can then change the expiration/archival date of one or more individual contacts within a cluster. The contact manager 103 can also identify transient windows for permanent contacts for clustering these contacts together with transient entries for e.g. searching across all entries.

In addition to the above, the contact manager 103 allows the user to search the contact information 105. The search results can be organized by class (permanent vs. transient entry), by transient cluster, by expiration date/degree of transience, etc. to allow users to be able to quickly locate both "strong" and "weak" contacts. For example, the user can indicate that he/she wants to view all "Transient" contacts. Therefore, the searching module 208 of the contact manager 103 identifies each contact entry associated with a "Transient" contact status and displays these contacts to the user.

Operational Flow Diagrams

Figure 10:
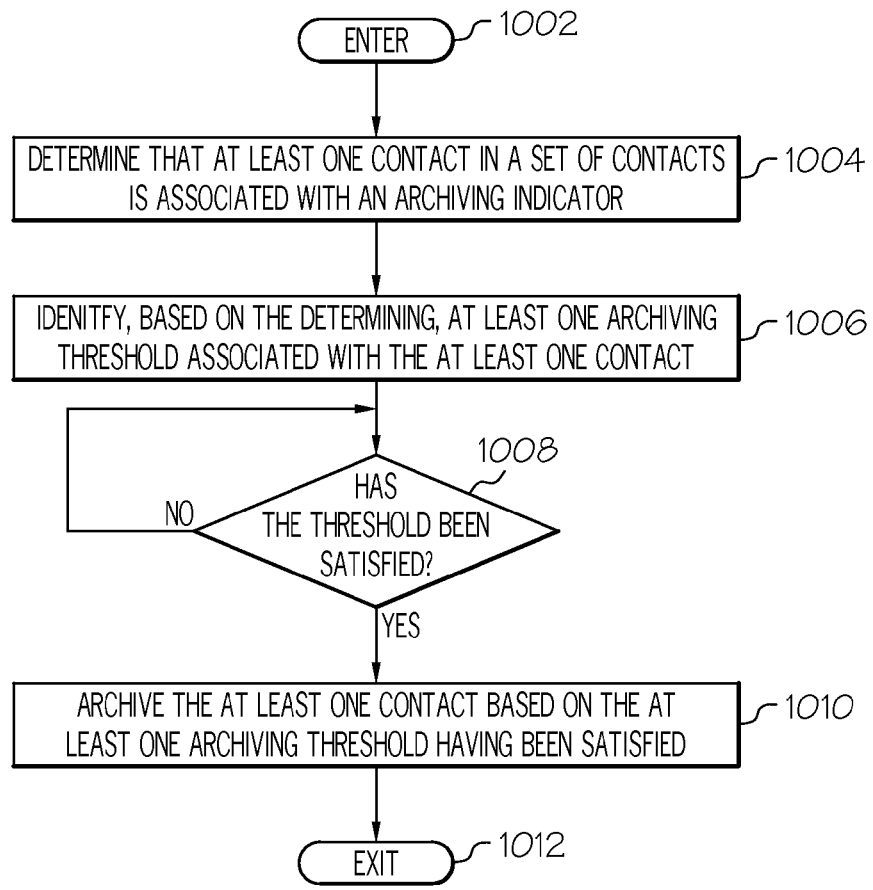
FIG. 10 is an operational flow diagram illustrating one example of a process for managing contacts according to one embodiment of the present invention.

FIG. 10 is an operational flow diagram illustrating one overview of managing contacts based on a user's interaction therewith. The operational flow of FIG. 10 starts at step 1002 and flows directly into step 1004. The contact manager 103, at step 1004, determines that at least one contact in a set of contacts 105 is associated with an archiving indicator. The archiving indicator indicates that one or more archiving operations are to be performed on the at least one contact. The set of contacts is associated with a user. The contact manager 103, at step 1006, identifies, based on the determining, at least one archiving threshold associated with the at least one contact. The contact manager 103, at step 1008, determines if the at least one archiving threshold has been satisfied. If the result of this determination is negative, the contact manager 103 continues to determine if the threshold has been satisfied. If the result of this determination is positive, the contact manager 103, at step 1010, archives archiving the at least one contact. The control flow exits at step 1012.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A system for managing contacts, the system comprising:
   a memory;
   a processor communicatively coupled to the memory; and
   a contact manager communicatively coupled to the memory and the processor, wherein the contact manager is configured to perform a method comprising:
      marking at least one contact in a set of contacts associated with a user with an archiving indicator, wherein the archiving indicator indicates that one or more archiving operations are to be performed on the at least one contact, where after being marked with the archiving indicator the at least one contact remains accessible by the user as an available contact;
      identifying, based on the marking, a first archiving threshold associated with the at least one contact, the first archiving threshold identifying at least one condition that triggers the one or more archiving operations to be performed on the at least one contact;
      identifying at least a second archiving threshold associated with the first archiving threshold;
      determining that the second archiving threshold has been satisfied;
      based on the second archiving threshold having been satisfied, adjusting the first archiving threshold, the adjusting comprising increasing at least one value associated with the at least one condition identified by the first archiving threshold;
      determining, after the adjusting the first archiving threshold, if the first archiving threshold has been satisfied; and
      archiving the at least one contact based on the first archiving threshold having been satisfied.

2. The system of claim 1, wherein the associating comprises one of:
   receiving an indication from the user to associate the at least one contact with the archiving indicator; and
   automatically associating the at least one contact with the archiving indicator based on one or more contact management rules.

3. The system of claim 2, wherein the associating comprises:
   automatically associating the at least one contact with the archiving indicator based on a number of interactions performed between the user and the at least one contact.

4. The system of claim 1, wherein the archiving comprises one of:
   preventing the at least one contact from being presented to the user as a contact in the set of contacts; and
   deleting the at least one contact from the set of contacts.

5. The system of claim 4, wherein the deleting comprises;
   removing the at least one contact from the set of contacts; and
   storing the at least one contact in a set of archived contacts.

6. The system of claim 1, wherein the first archiving threshold comprises at least one of:
   a date;
   a time interval; and
   a condition based on a number of interactions between the user and the at least one contact.

7. The system of claim 1, wherein the method further comprises:
   determining that the user has performed at least one interaction with the at least one contact; and
   removing the archiving indicator from association with the at least one contact based on the user having performed at least one interaction with the at least one contact, wherein the removing prevents the at least one contact from being archived.

8. The system of claim 1, method further comprises:
wherein determining that the second archiving threshold has been satisfied comprises:
determining that the user has performed at least one interaction with the at least one contact; and.

9. The system of claim 1, method further comprises:
receiving a request from the user to display the set of contacts;
identifying, based on the receiving, a first subset of contacts in the set of contacts associated with an archiving indicator;
identifying, based on the receiving, a second subset of contacts in the set of contacts failing to be associated with an archiving indicator;
presenting the first subset of contacts to the user as a first group of contacts; and
presenting the second subset of contacts to the user as a second group of contacts.

10. A computer program product for managing contacts, the computer program product comprising a non-transitory computer readable storage medium having program code embodied therewith, the program code readable/executable by a processor to:
mark at least one contact in a set of contacts associated with a user with an archiving indicator, wherein the archiving indicator indicates that one or more archiving operations are to be performed on the at least one contact, where after being marked with the archiving indicator the at least one contact remains accessible by the user as an available contact,
identify, based on the marking, a first archiving threshold associated with the at least one contact, the first archiving threshold identifying at least one condition that triggers the one or more archiving operations to be performed on the at least one contact;
identify at least a second archiving threshold associated with the first archiving threshold;
determine that the second archiving threshold has been satisfied;
based on the second archiving threshold having been satisfied, adjust the first archiving threshold, the adjusting comprising increasing at least one value associated with the at least one condition identified by the first archiving threshold;
determine, after the adjusting the first archiving threshold, if the first archiving threshold has been satisfied; and
archive the at least one contact based on the first archiving threshold having been satisfied.

11. The computer program product of claim 10, wherein the associating comprises one of:
receiving an indication from the user to associate the at least one contact with the archiving indicator; and
automatically associating the at least one contact with the archiving indicator based on one or more contact management rules.

12. The computer program product of claim 10, wherein the associating comprises:
automatically associating the at least one contact with the archiving indicator based on a number of interactions performed between the user and the at least one contact.

13. The computer program product of claim 10, wherein the archiving comprises one of:
preventing the at least one contact from being presented to the user as a contact in the set of contacts; and
deleting the at least one contact from the set of contacts.

14. The computer program product of claim 13, wherein the deleting comprises;
removing the at least one contact from the set of contacts; and
storing the at least one contact in a set of archived contacts.

15. The computer program product of claim 10, wherein the at least one archiving threshold comprises at least one of:
a date;
a time interval; and
a condition based on a number of interactions between the user and the at least one contact.

16. The computer program product of claim 10, wherein the program code is further readable/executable by the processor to:
determine that the user has performed at least one interaction with the at least one contact; and
remove the archiving indicator from association with the at least one contact based on the user having performed at least one interaction with the at least one contact, wherein the removing prevents the at least one contact from being archived.

17. The computer program product of claim 10, wherein the program code is further readable/executable by the processor to determine that the second archiving threshold has been satisfied by:
determining that the user has performed at least one interaction with the at least one contact.

18. The computer program product of claim 10, wherein the program code is further readable/executable by the processor to:
receive a request from the user to display the set of contacts;
identify, based on the receiving, a first subset of contacts in the set of contacts associated with an archiving indicator;
identify, based on the receiving, a second subset of contacts in the set of contacts failing to be associated with an archiving indicator;
present the first subset of contacts to the user as a first group of contacts; and
present the second subset of contacts to the user as a second group of contacts.

\* \* \* \* \*